(12) United States Patent
Pharand

(10) Patent No.: US 11,955,308 B1
(45) Date of Patent: Apr. 9, 2024

(54) WATER COOLED, AIR BEARING BASED ROTATING ANODE X-RAY ILLUMINATION SOURCE

(71) Applicant: KLA Corporation, Milpitas, CA (US)

(72) Inventor: Michel Pharand, Los Gatos, CA (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 17/950,768

(22) Filed: Sep. 22, 2022

(51) Int. Cl.
*H01J 35/10* (2006.01)
*F16C 33/10* (2006.01)

(52) U.S. Cl.
CPC ........ *H01J 35/106* (2013.01); *H01J 35/1017* (2019.05); *H01J 35/104* (2019.05); *F16C 33/107* (2013.01); *H01J 2235/1026* (2013.01)

(58) Field of Classification Search
CPC ................. H01J 35/1017; H01J 35/104; H01J 2235/1026
See application file for complete search history.

(56) References Cited

U.S. PATENT DOCUMENTS

| | | |
|---|---|---|
| 4,584,699 A | 4/1986 | LaFiandra et al. |
| 4,953,191 A | 8/1990 | Smither et al. |
| 4,972,449 A | 11/1990 | Upadhya et al. |
| 5,608,526 A | 3/1997 | Piwonka-Corle et al. |
| 5,859,424 A | 1/1999 | Norton et al. |
| 6,023,338 A | 2/2000 | Bareket |
| 6,192,107 B1 | 2/2001 | Price et al. |
| 6,341,157 B1 | 1/2002 | Sakabe |
| 6,429,943 B1 | 8/2002 | Opsal et al. |
| 6,711,233 B2 | 3/2004 | Hertz et al. |
| 6,716,646 B1 | 4/2004 | Wright et al. |

(Continued)

FOREIGN PATENT DOCUMENTS

| | | |
|---|---|---|
| JP | 2008091190 | 4/2008 |
| JP | 2016071991 | 5/2016 |

(Continued)

OTHER PUBLICATIONS

Lemaillet, Germer, Kline et al.,"Intercomparison between optical and x-ray scatterometry measurements of FinFET structures" by Proc. SPIE, v.8681, p. 86810Q (2013).

(Continued)

*Primary Examiner* — Chih-Cheng Kao
(74) *Attorney, Agent, or Firm* — Spano Law Group; Joseph S. Spano

(57) ABSTRACT

Methods and systems for realizing a high speed, rotating anode based x-ray illumination source suitable for high throughput x-ray metrology are presented herein. A high speed rotating anode includes a water cooled rotating platen supported by radial and thrust air bearings employing cascaded differential pumping. A very high bending stiffness of the rotating assembly is achieved by spacing radial air bearings far apart and locating a rotary motor and thrust bearings between the radial air bearings. The high bending stiffness increases the mechanical stability of the rotating assembly during high speed operation, and thus decreases vibration at the location of impingement of the electron beam on the rotating anode material. In some embodiments, magnetic thrust bearings are employed and the air gap is controlled to maintain a desired gap over an operational range of up to three millimeters.

20 Claims, 5 Drawing Sheets

(56) References Cited

U.S. PATENT DOCUMENTS

| | | | |
|---|---|---|---|
| 6,778,275 | B2 | 8/2004 | Bowes |
| 6,787,773 | B1 | 9/2004 | Lee |
| 6,992,764 | B1 | 1/2006 | Yang et al. |
| 7,005,774 | B2 | 2/2006 | Kuribayashi et al. |
| 7,242,477 | B2 | 7/2007 | Mieher et al. |
| 7,321,426 | B1 | 1/2008 | Poslavsky et al. |
| 7,406,153 | B2 | 7/2008 | Berman |
| 7,440,549 | B2 | 10/2008 | Kerpershoek et al. |
| 7,478,019 | B2 | 1/2009 | Zangooie et al. |
| 7,483,517 | B2 | 1/2009 | Barschdorf et al. |
| 7,518,134 | B2 | 4/2009 | Ivanov et al. |
| 7,626,702 | B2 | 12/2009 | Ausschnitt et al. |
| 7,656,528 | B2 | 2/2010 | Abdulhalim et al. |
| 7,826,071 | B2 | 11/2010 | Shchegrov et al. |
| 7,842,933 | B2 | 11/2010 | Shur et al. |
| 7,873,585 | B2 | 1/2011 | Izikson |
| 7,929,667 | B1 | 4/2011 | Zhuang et al. |
| 7,933,026 | B2 | 4/2011 | Opsal et al. |
| 8,068,662 | B2 | 11/2011 | Zhang et al. |
| 8,138,498 | B2 | 3/2012 | Ghinovker |
| 8,243,884 | B2 | 8/2012 | Rodhammer et al. |
| 8,565,381 | B2 | 10/2013 | Sukowski et al. |
| 8,582,722 | B2 | 11/2013 | Tadokoro et al. |
| 8,629,606 | B2 | 1/2014 | Kakonyi |
| 9,159,524 | B2 | 10/2015 | Hovarth et al. |
| 9,594,036 | B2 | 3/2017 | Yun et al. |
| 9,693,439 | B1 | 6/2017 | Zhuang et al. |
| 9,715,989 | B2 | 7/2017 | Dalakos et al. |
| 9,726,624 | B2 | 8/2017 | Ryan et al. |
| 2003/0021465 | A1 | 1/2003 | Adel et al. |
| 2004/0234033 | A1 | 11/2004 | Anno et al. |
| 2007/0221842 | A1 | 9/2007 | Morokuma et al. |
| 2009/0152463 | A1 | 6/2009 | Toyoda et al. |
| 2009/0225950 | A1* | 9/2009 | Yonezawa ............. H01J 35/106 378/133 |
| 2010/0002842 | A1 | 1/2010 | Kerpershoek et al. |
| 2010/0166149 | A1* | 7/2010 | Okamura ............. F16C 33/103 148/579 |
| 2011/0058654 | A1* | 3/2011 | Tadokoro ............. H01J 35/104 378/130 |
| 2011/0129068 | A1 | 6/2011 | Lewalter et al. |
| 2011/0266440 | A1 | 11/2011 | Boughorbel et al. |
| 2012/0292502 | A1 | 11/2012 | Langer et al. |
| 2013/0208279 | A1 | 8/2013 | Smith |
| 2013/0304424 | A1 | 11/2013 | Bakeman et al. |
| 2014/0019097 | A1 | 1/2014 | Bakeman et al. |
| 2014/0111791 | A1 | 4/2014 | Manassen et al. |
| 2014/0172394 | A1 | 6/2014 | Kuznetsov et al. |
| 2014/0222380 | A1 | 8/2014 | Kuznetsov et al. |
| 2014/0247922 | A1* | 9/2014 | Ueki ............. F16C 17/026 378/133 |
| 2014/0297211 | A1 | 10/2014 | Pandev et al. |
| 2014/0369476 | A1 | 12/2014 | Harding |
| 2015/0092924 | A1 | 4/2015 | Yun et al. |
| 2015/0110249 | A1 | 4/2015 | Bakeman et al. |
| 2015/0117610 | A1 | 4/2015 | Veldman et al. |
| 2015/0204664 | A1 | 7/2015 | Bringoltz et al. |
| 2015/0300965 | A1 | 10/2015 | Sezginer et al. |
| 2016/0202193 | A1 | 7/2016 | Hench et al. |
| 2016/0320319 | A1 | 11/2016 | Hench et al. |
| 2017/0160212 | A1 | 6/2017 | Kleine et al. |
| 2017/0167862 | A1 | 6/2017 | Dziura et al. |
| 2018/0106735 | A1 | 4/2018 | Gellineau et al. |
| 2019/0115184 | A1* | 4/2019 | Zalubovsky ............. H01J 35/10 |
| 2021/0310717 | A1 | 10/2021 | Seelinger et al. |
| 2022/0178851 | A1 | 6/2022 | Yun et al. |
| 2023/0018791 | A1* | 1/2023 | Ide ............. F16C 33/107 |

FOREIGN PATENT DOCUMENTS

| | | | |
|---|---|---|---|
| WO | 2016010448 | A1 | 1/2016 |
| WO | 2016023949 | A1 | 2/2016 |

OTHER PUBLICATIONS

Kline et al., "X-ray scattering critical dimensional metrology using a compact x-ray source for next generation semiconductor devices," J. Micro/Nanolith. MEMS MOEMS 16(1), 014001 (Jan.-Mar. 2017).
International Search Report dated Dec. 27, 2023, for PCT Application No. PCT/US2023/032449 filed on Sep. 12, 2023 by KLA Corporation, 3 pages.

* cited by examiner

WATER COOLED, AIR BEARING BASED ROTATING ANODE X-RAY ILLUMINATION SOURCE

TECHNICAL FIELD

The described embodiments relate to x-ray based metrology systems and methods, and more particularly to methods and systems for improved X-ray illumination and measurement accuracy.

BACKGROUND INFORMATION

The various features and multiple structural levels of semiconductor devices such as logic and memory devices are typically fabricated by a sequence of processing steps applied to a specimen. For example, lithography among others is one semiconductor fabrication process that involves generating a pattern on a semiconductor wafer. Additional examples of semiconductor fabrication processes include, but are not limited to, chemical-mechanical polishing, etch, deposition, and ion implantation. Multiple semiconductor devices may be fabricated on a single semiconductor wafer and then separated into individual semiconductor devices.

Metrology processes are used at various steps during a semiconductor manufacturing process to detect defects on wafers to promote higher yield. Optical metrology techniques offer the potential for high throughput without the risk of sample destruction. A number of optical metrology based techniques including scatterometry and reflectometry implementations and associated analysis algorithms are commonly used to characterize critical dimensions, film thicknesses, composition and other parameters of nanoscale structures.

As devices (e.g., logic and memory devices) move toward smaller nanometer-scale dimensions, characterization becomes more difficult. Devices incorporating complex three-dimensional geometry and materials with diverse physical properties contribute to characterization difficulty. For example, modern memory structures are often high-aspect ratio, three-dimensional structures that make it difficult for optical radiation to penetrate to the bottom layers. In addition, the increasing number of parameters required to characterize complex structures (e.g., FinFETs), leads to increasing parameter correlation. As a result, the parameters characterizing the target often cannot be reliably decoupled with available measurements. In another example, opaque, high-k materials are increasingly employed in modern semiconductor structures. Optical radiation is often unable to penetrate layers constructed of these materials. As a result, measurements with thin-film scatterometry tools such as ellipsometers or reflectometers are becoming increasingly challenging.

In response, more complex optical tools have been developed. For example, tools with multiple angles of illumination, shorter and broader ranges of illumination wavelengths, and more complete information acquisition from reflected signals (e.g., measuring multiple Mueller matrix elements in addition to the more conventional reflectivity or ellipsometric signals) have been developed. However, these approaches have not reliably overcome fundamental challenges associated with measurement of many advanced targets (e.g., complex 3D structures, structures smaller than 10 nm, structures employing opaque materials) and measurement applications (e.g., line edge roughness and line width roughness measurements).

Atomic force microscopes (AFM) and scanning-tunneling microscopes (STM) are able to achieve atomic resolution, but they can only probe the surface of the specimen. In addition, AFM and STM microscopes require long scanning times. Scanning electron microscopes (SEM) achieve intermediate resolution levels, but are unable to penetrate structures to sufficient depth. Thus, high-aspect ratio holes are not characterized well. In addition, the required charging of the specimen has an adverse effect on imaging performance.

To overcome penetration depth issues, traditional imaging techniques such as TEM, SEM etc., are employed with destructive sample preparation techniques such as focused ion beam (FIB) machining, ion milling, blanket or selective etching, etc. For example, transmission electron microscopes (TEM) achieve high resolution levels and are able to probe arbitrary depths, but TEM requires destructive sectioning of the specimen. Several iterations of material removal and measurement generally provide the information required to measure the critical metrology parameters throughout a three dimensional structure. But, these techniques require sample destruction and lengthy process times. The complexity and time to complete these types of measurements introduces large inaccuracies due to drift of etching and metrology steps. In addition, these techniques require numerous iterations which introduce registration errors.

Another response to recent metrology challenges has been the adoption of x-ray metrology for measurements including film thickness, critical dimension, composition, strain, surface roughness, line edge roughness, and porosity.

Small-Angle X-Ray Scatterometry (SAXS) systems have shown promise to address challenging measurement applications. Various aspects of the application of SAXS technology to the measurement of critical dimensions (CD-SAXS) and overlay (OVL-SAXS) are described in 1) U.S. Pat. No. 7,929,667 to Zhuang and Fielden, entitled "High-brightness X-ray metrology," 2) U.S. Patent Publication No. 2014/0019097 by Bakeman, Shchegrov, Zhao, and Tan, entitled "Model Building And Analysis Engine For Combined X-Ray And Optical Metrology," 3) U.S. Patent Publication No. 2015/0117610 by Veldman, Bakeman, Shchegrov, and Mieher, entitled "Methods and Apparatus For Measuring Semiconductor Device Overlay Using X-Ray Metrology," 4) U.S. Patent Publication No. 2016/0202193 by Hench, Shchegrov, and Bakeman, entitled "Measurement System Optimization For X-Ray Based Metrology," 5) U.S. Patent Publication No. 2017/0167862 by Dziura, Gellineau, and Shchegrov, entitled "X-ray Metrology For High Aspect Ratio Structures," and 6) U.S. Patent Publication No. 2018/0106735 by Gellineau, Dziura, Hench, Veldman, and Zalubovsky, entitled "Full Beam Metrology for X-Ray Scatterometry Systems." The aforementioned patent documents are assigned to KLA-Tencor Corporation, Milpitas, California (USA) and are incorporated herein by reference in their entirety.

Research on CD-SAXS metrology of semiconductor structures is also described in scientific literature. Most research groups have employed high-brightness X-ray synchrotron sources which are not suitable for use in a semiconductor fabrication facility due to their immense size, cost, etc. One example of such a system is described in the article entitled "Intercomparison between optical and x-ray scatterometry measurements of FinFET structures" by Lemaillet, Germer, Kline et al., Proc. SPIE, v.8681, p. 86810Q (2013). More recently, a group at the National Institute of Standards and Technology (NIST) has initiated research employing compact and bright X-ray sources similar those described in U.S. Pat. No. 7,929,667. This research is described in an article entitled "X-ray scattering critical dimensional metrology using a compact x-ray source for next generation semiconductor devices," J. Micro/Nanolith. MEMS MOEMS 16(1), 014001 (January-March 2017).

SAXS has also been applied to the characterization of materials and other non-semiconductor related applications. Exemplary systems have been commercialized by several companies, including Xenocs SAS (www.xenocs.com), Bruker Corporation (www.bruker.com), and Rigaku Corporation (www.rigaku.com/en).

Many x-ray metrology techniques used in semiconductor manufacturing can benefit from high brightness x-ray sources. For example, critical dimension small angle x-ray scattering (CD-SAXS) measurements often require long integration times due to the low scattering of certain materials. A high brightness source can improve the throughput of CD-SAXS measurements.

Development efforts in the area of extreme ultraviolet (EUV) lithography are focused on light sources that emit narrowband radiation (e.g., +/−0.1 nm) centered at 13 nanometers (i.e., 92.6 electron volts) at high power levels (e.g., 210 watts of average power at the intermediate focus of the illuminator). Light sources for EUV lithography have been developed using a laser droplet plasma architecture. For example, xenon, tin, and lithium droplet targets operating at pulse repetition frequencies of approximately 100 kHz are pumped by CO2 coherent sources. The realized light is high power (e.g., 210 watts of average power at the intermediate focus of the illuminator is the goal for lithography tools at 13 nanometers). However, the resulting radiation is relatively low energy (92.6 electron volts), which severely limits the utility of these illumination sources in metrology applications. An exemplary system is described in U.S. Pat. No. 7,518,134 to ASML Netherlands B.V., the content of which is incorporated herein by reference in its entirety.

In some examples, x-ray illumination light is generated by high energy electron beam bombardment of a solid target material, such as rotating anode target material. Rotating anode X-ray sources are commonly employed for medical imaging and analytical chemistry applications. Numerous versions of rotating anode X-ray sources are manufactured by companies such as Philips, General Electric, Siemens, and others, for medical imaging applications such as tomography, mammography, angiography, etc. Rigaku Corporation and Bruker Corporation manufacture continuously operated rotating anode sources for analytical chemistry applications such as X-Ray diffraction (XRD), X-Ray Reflectometry (XRR), small angle X-Ray scatterometry (SAXS), wide angle X-Ray scatterometry (WAXS), etc.

Rotating anode targets enable more effective heat removal from the anode material compared to stationary anode targets. Continuously moving the location of electron beam impingement on the anode surface results in convective heat dissipation that decreases focal spot impact temperature and improves X-ray tube power loading capability. A typical rotating anode source rotates anode material at 5,000-10,000 revolutions per minute, or higher. The linear speed of the anode material at the focal spot location may be 100 meters/second, or higher.

Improvements directed toward increased anode heat dissipation and thermal conductivity have been proposed. For example, the FR-X model X-ray sources manufactured by Rigaku Corporation (Japan) and the MicroMax model X-ray sources manufactured by Bruker AXS GmbH (Germany) employ water cooling to dissipate heat generated at the anode.

U.S. Pat. No. 9,715,989 describes a rotating anode structure with high thermal conductivity diamond layers. U.S. Pat. No. 8,243,884 describes the use of diamond-metal composite materials to improve heat dissipation. U.S. Pat. No. 7,440,549 describes a rotating anode device that dissipates heat by a heat pipe effect. U.S. Patent Publication No. 2015/0092924 describes a microstructural anode including a high atomic number material embedded in a high thermal conductivity matrix. U.S. Pat. Nos. 9,159,524 and 9,715,989 describe similar diamond-based heat management solutions in the context of stationary anode sources. The contents of the aforementioned U.S. Patents and U.S. Patent Publications are incorporated herein by reference in their entirety.

Despite improved power loading capabilities, rotating anode sources suffer from significant limitations. For example, operating a rotary anode structure at high speed generates an excessive amount of heat that is not easily dissipated in a high vacuum environment. In addition, the use of mechanical bearings leads to significant heat generation that can produce mechanical instability and bearing failure at high speed.

Furthermore, the use of ferrofluidic seals to isolate the rotary drive and bearing components from the high vacuum environment leads to significant frictional losses and excessive heat generation, particularly at high rotational speeds. In addition, contamination of the high vacuum environment by material outgassing from the ferrofluidic seals is a significant issue.

Future metrology applications present challenges for metrology due to increasingly high resolution requirements, multi-parameter correlation, increasingly complex geometric structures, and increasing use of opaque materials. The adoption of x-ray metrology for semiconductor applications requires improved x-ray sources with the highest possible brightness. Rotary anode drive systems with higher speed capability, improved reliability, and reduced contamination are desired.

SUMMARY

Methods and systems for realizing a high speed, rotating anode based x-ray illumination source suitable for high throughput x-ray metrology are presented herein. A high brightness x-ray source is produced by bombarding a rotating anode material with a stream of electrons to generate x-ray radiation. The resulting x-ray emission is collected and provided to a semiconductor specimen to perform x-ray based metrology on the specimen.

In one aspect, a high speed rotating anode includes a water cooled rotating platen supported by radial and thrust air bearings employing cascaded differential pumping. The air bearings allow for rotation at very high speeds with extremely low friction and much greater reliability compared to mechanical bearings. With reduced friction, a compact rotary motor provides sufficient torque to drive the rotating anode at high speed. Differential pumping provides a vacuum seal with significantly less viscous drag compared to conventional ferrofluidic seals without the risk of material contamination of the vacuum environment. With significantly less friction, heat generated in the rotating assembly is minimized, and stability of the rotating assembly during high speed operation is improved.

In another aspect, the rotary motor and thrust bearings are located between radial air bearings. A very high bending stiffness of the rotating assembly is achieved by spacing the radial air bearings far apart and locating the rotary motor and thrust bearings between the radial air bearings. The high bending stiffness increases the mechanical stability of the rotating assembly during high speed operation, and thus decreases vibration at the location of impingement of the electron beam on the rotating anode material.

In some embodiments, the distance, D, between the radial air bearings is greater than 80% of the total length, L, of the rotary spindle shaft. In addition, the center of mass of the rotating assembly is located close to the center of bending stiffness of the rotating assembly. In some embodiments, the center of mass of the rotating assembly is within 5 centimeters of the center of bending stiffness of the rotating assembly. Furthermore, in some embodiments, the rotary motor is located within 5 centimeters of the center of mass of the rotating assembly.

In another aspect, the radial air bearing facing the vacuum chamber includes vacuum scavenged annular grooves at the interface with the vacuum chamber to minimize molecular flow from the air bearing to the vacuum chamber.

In another aspect, the radial air bearing facing the terminal end of rotary spindle shaft includes a rotary coupling including water cooling channels to deliver cooling fluid to the rotary platen.

In another aspect, the thrust bearings operate as a squeeze film damper to minimize vibration in the axial direction.

In some embodiments, the thrust bearings are magnetic bearings. In general, magnetic bearings are less stiff in the loading direction compared to air bearings. However, the gap between the magnetic bearing and the opposing surface is actively controlled. In some embodiments, the magnetic bearing is controlled to maintain a fixed gap. In some other embodiments, the magnetic bearing is controlled to maintain a desired gap over an operational range of up to three millimeters. This may be desirable to continuously refresh the anode material in the path of the electron beam during operation by continuously moving the anode material in the axial direction, while spinning the rotary platen at high speed.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Systems employed to measure structural and material characteristics (e.g., material composition, dimensional characteristics of structures and films, etc.) associated with different semiconductor fabrication processes based on x-ray illumination are presented. More specifically, methods and systems for realizing a high speed, rotating anode based x-ray illumination source suitable for high throughput x-ray metrology are presented herein.

In one aspect, a high brightness x-ray source is produced by bombarding a rotating anode material with a stream of electrons to generate x-ray radiation. The resulting x-ray emission is collected and provided to a semiconductor specimen to perform x-ray based metrology on the specimen.

A high speed rotating anode reliably operating in high vacuum without producing excessive heat is enabled by a water cooled rotating platen supported by radial and thrust air bearings employing cascaded differential pumping. The air bearings allow for rotation at very high speeds with extremely low friction and much greater reliability compared to mechanical bearings. With reduced friction, a compact rotary motor provides sufficient torque to drive the rotating anode at high speed. Differential pumping provides a vacuum seal with significantly less viscous drag compared to conventional ferrofluidic seals without the risk of material contamination of the vacuum environment. With significantly less friction, heat generated in the rotating assembly is minimized, and stability of the rotating assembly during high speed operation is improved.

The high energy nature of x-ray radiation allows for the penetration of x-rays into optically opaque thin films, buried structures, high-aspect ratio structures and devices containing many thin film layers. Many x-ray metrology techniques used in semiconductor manufacturing benefit from a high brightness, reliable x-ray source, e.g., critical dimension small angle x-ray scattering (CD-SAXS).

Measurements often need long integration times due to the low scattering efficiency of materials comprising many modern semiconductor structures. A high brightness, high power rotating anode x-ray source improves the throughput of x-ray based measurements, e.g., CD-SAXS.

Figure 1:
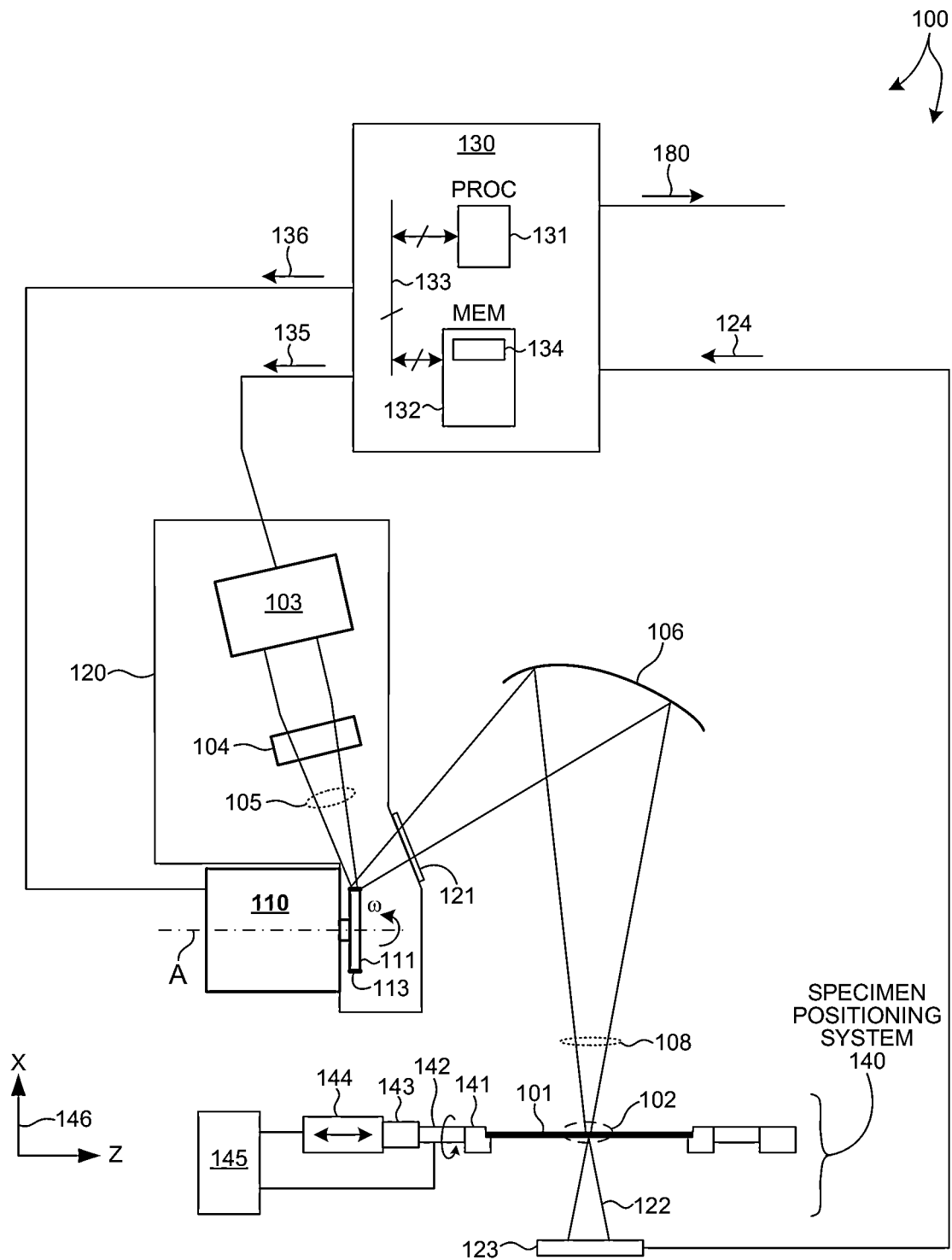
FIG. 1 is a simplified diagram illustrative of an embodiment of a metrology system including a water cooled, air bearing based rotating anode X-Ray illumination source for measuring characteristics of a specimen in at least one novel aspect.

FIG. 1 illustrates an embodiment of an x-ray based metrology system 100 including a high speed rotating anode subsystem 110 in one embodiment. By way of non-limiting example, x-ray metrology system 100 operates in a transmission mode. As depicted in FIG. 1, the x-ray illumination source includes an electron beam source 103 and rotating anode subsystem 110 including an anode material 113 disposed on a rotating platen 111. The rotating anode subsystem 110 includes a rotational actuator that rotates platen 111 about an axis of rotation, A, at an angular velocity, ω.

In the embodiment depicted in FIG. 1, computing system 130 is communicatively coupled to rotating anode subsystem 110. In one example, command signals 136 are communicated to rotating anode subsystem 110 from computing system 130 indicating a desired angular velocity of the rotating platen 111. In response, rotating anode subsystem 110 adjusts the angular velocity of the rotating platen 111 based on command signals 136. The air bearing based rotating anode subsystem 110 is capable of high rotational speeds without excessive frictional losses and heat generation. In some embodiments, rotating anode subsystem 110 is operable at any desired rotational speed from zero revolutions per minute to 40,000 revolutions per minute. For a platen 111 having a diameter of 100 millimeters, the tangential velocity of anode material 113 is operable at any desired linear speed from zero meters/second to 210 meters/second. In other embodiments, even higher rotational speeds, e.g., up to 100,000 revolutions per minute are contemplated within the scope of this patent document.

In the embodiment depicted in FIG. 1, the x-ray illumination source provides high brightness x-ray illumination delivered to a specimen 101 over an inspection area 102. X-ray metrology system 100 is configured such that x-rays which interact with the specimen 101 are collected by a detector 123 while a specimen positioning system 140 positions the specimen to produce angularly resolved interactions of the sample with the x-rays. In some embodiments, any other particles produced during the interaction such as photoelectrons, x-rays produced through fluorescence, or ions may also be detected.

In the embodiment depicted in FIG. 1, the x-ray illumination source includes an electron beam source 103 (e.g., electron gun) configured to generate electron emission from a cathode. In the depicted embodiment, electron beam source 103 generates a stable stream of free electrons 105. The stream of electrons 105 is shaped by electron optics 104 and is incident on anode material 113 supported by rotating platen 111. In some embodiments, the electron beam source 103 is configured to generate a continuous electron beam. In some other embodiments, the electron beam source 103 is configured to generate a pulsed electron beam.

In the embodiment depicted in FIG. 1, electron beam source 103 is communicatively coupled to computing system 130, and electron beam source 103 is actively controlled based on command signals 135 communicated from computing system 130 to electron beam source 103. In some examples, command signals 135 include an indication of desired electron beam energy to be supplied by electron beam source 103. In response, electron beam source 103 adjusts electron beam energy output to the desired value. In some embodiments, the electron beam source 103 accelerates the stream of focused electrons 105 with a voltage differential greater than 10 kV.

Electron optics 104 are configured to direct and/or focus the stream of electrons 105 toward the anode material 113. Electron optics 104 includes suitable electromagnets, permanent magnets, or any combination of electromagnets and permanent magnets for focusing the electron beam and directing the stream of electrons 105. In some embodiments, electron optics 104 may include solenoids, quadrupole lenses such as Halbach cylinders or electrostatic elements such as Einzel lenses to focus and direct the electron beam. In addition, electron optics 104 may be configured as an electron monochromator. Moreover, electron optics 104 may be employed to focus the beam to further reduce electron beam noise.

In addition, electron optics 104 may be configured for active control by computing system 130. In some embodiments (not shown), computing system 130 is communicatively coupled to electron optics 104. In some examples, current or voltage supplied to electromagnetic elements may be actively controlled based on command signals communicated from computing system 130 to electron optics 104. In another example, the position of a magnetic element (e.g., a permanent magnet) may be manipulated by a positioning system (not shown) based on command signals communicated from computing system 130 to electron optics 104. In this manner, the focusing and directing of the stream of electrons 105 is achieved under the control of computing system 130 to achieve a stable stream of electrons 105 incident on anode material 113.

As depicted in FIG. 1, x-ray optics 106 are configured to collect x-ray emission from the spot of incidence of the stream of electrons 105 and anode material 113 and shape and direct incident x-ray beam 108 to specimen 101.

In another aspect, x-ray optics 106 are configured at specific collection angles to capture x-ray emission in the desired energy band at peak intensity. In some embodiments, x-ray optics 106 are designed to directly focus x-ray radiation to the measurement target. When a high energy focused electron beam impinges upon an anode target, the stimulated x-ray emission includes broadband Bremsstrahlung radiation and characteristic line emission (i.e., Kα, Kβ, Lα, Tβ, etc.). In some embodiments, x-ray collection optics are oriented in such a way as to optimize x-ray brightness by collecting x-ray radiation over a range of collection angles.

In some examples, x-ray optics 106 monochromatize the x-ray beam that is incident on the specimen 101. In some examples, x-ray optics 106 collimate or focus the x-ray beam 108 onto inspection area 102 of specimen 101. In some embodiments, x-ray optics 106 includes one or more x-ray collimating mirrors, x-ray apertures, x-ray monochromators, and x-ray beam stops, multilayer optics, refractive x-ray optics, diffractive optics such as zone plates, or any combination thereof.

In some embodiments, advanced x-ray optics such as polycapillary x-ray optics, specular optics, or optics arranged in a Loxley-Tanner-Bowen configuration are employed to achieve high-brightness, small spot size illumination of a semiconductor specimen. For example, high intensity x-ray beams can be transported and focused to spot sizes of less than 40 micrometers using specular x-ray optics such as grazing incidence ellipsoidal mirrors, polycapillary optics such as hollow capillary x-ray waveguides, multilayer optics, or crystalline optics such as a Loxley-Tanner-Bowen system.

In preferred embodiments, x-ray optics 106 are multilayer optics. In some of these embodiments, multilayer optics are employed to monochromatize the x-ray beam 108 to a spectral purity, $\delta\lambda/\lambda$, of less than $10^{-1}$. This level of spectral purity is suitable for metrology technologies such as x-ray reflectivity (XRR), x-ray diffraction (XRD), and x-ray fluorescence (XRF). In some other embodiments, crystal monochromators are employed to monochromatize the x-ray beam 108 to a spectral purity, WA, of less than $10^{-6}$. This level of spectral purity is suitable for metrology technologies such as high resolution x-ray diffraction (HRXRD).

X-ray optics 106 may be configured for active control by computing system 130. In some embodiments, computing system 130 is communicatively coupled to x-ray optics 106 (not shown). In one example, command signals communicated to x-ray optics 106 from computing system 130 indicate a desired position of an optical element. The position of the optical element may be adjusted by a positioning system (not shown) based on the command signal. In this manner, the focusing and directing of the x-ray beam 108 is achieved under the control of computing system 130 to achieve a stable illumination incident on specimen 101. In some examples, computing system 130 is configured to control the positioning and spot size of the x-ray beam 108 incident on specimen 101. In some examples, computing system 130 is configured to control illumination properties of the x-ray beam 108 (e.g., intensity, polarization, spectrum, etc.).

As depicted in FIG. 1, x-ray detector 123 collects x-ray radiation 122 scattered from specimen 101 in response to the incident x-ray illumination and generates an output signal 124 indicative of properties of specimen 101 that are sensitive to the incident x-ray radiation. Scattered x-rays 122 are collected by x-ray detector 123 while specimen positioning system 140 locates and orients specimen 101 to produce angularly resolved scattered x-rays.

As depicted in FIG. 1, the x-ray illumination source is maintained in a vacuum environment maintained within vacuum chamber 120. In some embodiments, vacuum less than 1e-8 torr is maintained within vacuum chamber 120. X-ray emission passes through vacuum window 121 as the x-rays propagate from anode material 113 toward x-ray optics 106. Vacuum window 121 may be constructed of any suitable material that is substantially transparent to x-ray radiation (e.g., Kapton, Beryllium, etc.).

Figure 2:
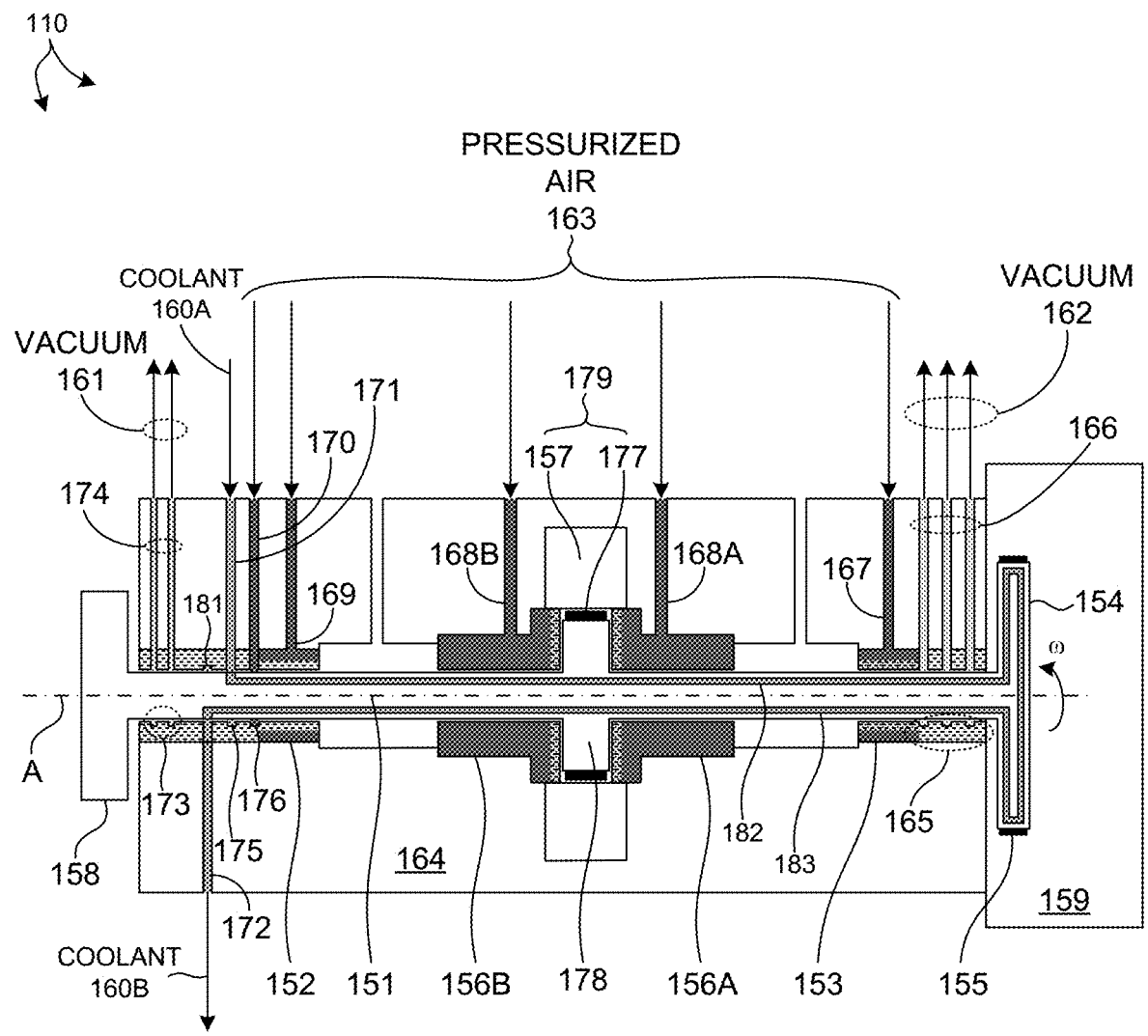
FIG. 2 is a simplified diagram illustrative of a cross-sectional view of an embodiment of a water cooled, air bearing based rotating anode subsystem in at least one novel aspect.

FIG. 2 depicts a cross-sectional view of rotating anode subassembly 110 depicted in FIG. 1 in one embodiment. As depicted in FIG. 2, rotating anode subassembly 110 includes rotary spindle shaft 151. One end of the rotary spindle shaft extends through an opening in a wall of vacuum chamber 159. Rotary platen 154 is attached to rotary spindle shaft 151 inside vacuum chamber 159. In this manner, rotary platen 154 rotates within vacuum chamber 159. Counterweight 158 is attached to the opposite end of rotary spindle 151. In some embodiments, rotary platen 154, counterweight 158, or both are removably attached to rotary spindle shaft 151. However, in some other embodiments rotary platen 154, counterweight 158, or both are permanently fixed to rotary spindle shaft 151. The rotating assembly, including rotary spindle shaft 151, platen 154, and counterweight 158, rotates about axis, A, at angular velocity, ω.

Anode material 155 is disposed on a surface of rotary platen 154. In the embodiment depicted in FIG. 2, anode material 155 is disposed on a perimeter surface of rotary platen 154 oriented parallel to axis, A. In some other embodiments, anode material 155 is disposed on the face of rotary platen 154 oriented perpendicular to axis, A. In the embodiment depicted in FIG. 2, rotary platen 154 is disk shaped. However, in other embodiments, different shapes, e.g., conical shapes, curved shapes, etc. may be contemplated. In this manner, anode material 113 may be optimally positioned with respect to the electron beam source. In some embodiments, the diameter of rotary platen 154 is approximately 100 millimeters. However, in general, rotary platen 154 may be any suitable diameter.

As depicted in FIG. 2, the rotating assembly is supported by radial air bearings 152 and 153, and thrust bearings 156A and 156B. Bearings 152, 153, and 156A-B are fixed to housing 164, and are coupled to a pressurized gas source, e.g., clean, dry, compressed air source. In the embodiment depicted in FIG. 2, pressurized clean, dry air 163 is delivered to radial air bearings 152 and 153 and thrust bearings 156A and 156B via ports 169, 168A, 168B, and 167, respectively. In a preferred embodiment, radial air bearings 152 and 153 and thrust bearings 156A-B are porous air bearings. However, in some other embodiments, any of radial air bearings 152 and 153 and thrust bearings 156A-B is a groove compensated air bearing.

Bearings 152, 153, and 156A-B allow free rotation of the rotating assembly about axis, A, but constrain all other degrees of freedom within very tight tolerances. Radial air bearings 152 and 153 exhibit a high stiffness in the direction perpendicular to rotational axis, A, of the rotary spindle shaft. In other words, radial air bearings 152 and 153 support a very large load in the direction perpendicular to rotational axis, A, of the rotary spindle shaft with very little deflection in the same direction. In one example, the maximum runout of the rotating assembly is less than two micrometers.

Thrust bearings 156A-B are located between radial air bearings 152 and 153. Flange 178 of rotary spindle shaft 151 is located between thrust bearings 156A and 156B. The surface of flange 178 facing counterweight 158 is separated by a small air gap from the bearing face of thrust bearing 156B. The surface of flange 178 facing platen 154 is separated by a small air gap from the bearing face of thrust bearing 156A. In combination, thrust bearings 156A-B exhibit a high stiffness in the direction parallel to rotational axis, A, of the rotary spindle shaft. In other words, thrust bearings 156A-B support a very large load in the direction parallel to rotational axis, A, of the rotary spindle shaft with very little deflection in the same direction.

As depicted in FIG. 2, rotating anode subassembly 110 includes a rotary motor 179 disposed between radial air bearings 152 and 153. The rotary motor 179 includes a stator mechanically coupled to housing 164 and a rotor 177 mechanically coupled rotary spindle shaft 151. In the embodiment depicted in FIG. 2, rotor 177 is mounted to the perimeter face of flange 178. However, in general, rotor 177 may be mounted to rotary spindle shaft 151 in a different location. The rotary motor 179 applies a rotational torque to the rotary spindle shaft 151 and drives the rotation of platen 154. In some embodiments, the rotary motor 179 is a brushless servo motor. In some of these embodiments, the brushless servo motor is ironless. However, in some other embodiments, the brushless servo motor includes an iron core to concentrate magnetic flux to realize higher torque with a smaller size motor.

In one aspect, both rotary motor 179 and thrust bearings 156A-B are located between radial air bearings 152 and 153. By spacing radial air bearings 152 and 153 far apart and locating rotary motor 179 and thrust bearings 156A-B between radial air bearings 152 and 153, a very high bending stiffness of the rotating assembly, e.g., greater than 500,000 Newton-meters per radians is achieved. The high bending stiffness increases the mechanical stability of the rotating assembly during high speed operation, and thus decreases vibration at the location of impingement of the electron beam 105 on anode material 155.

Figure 3:
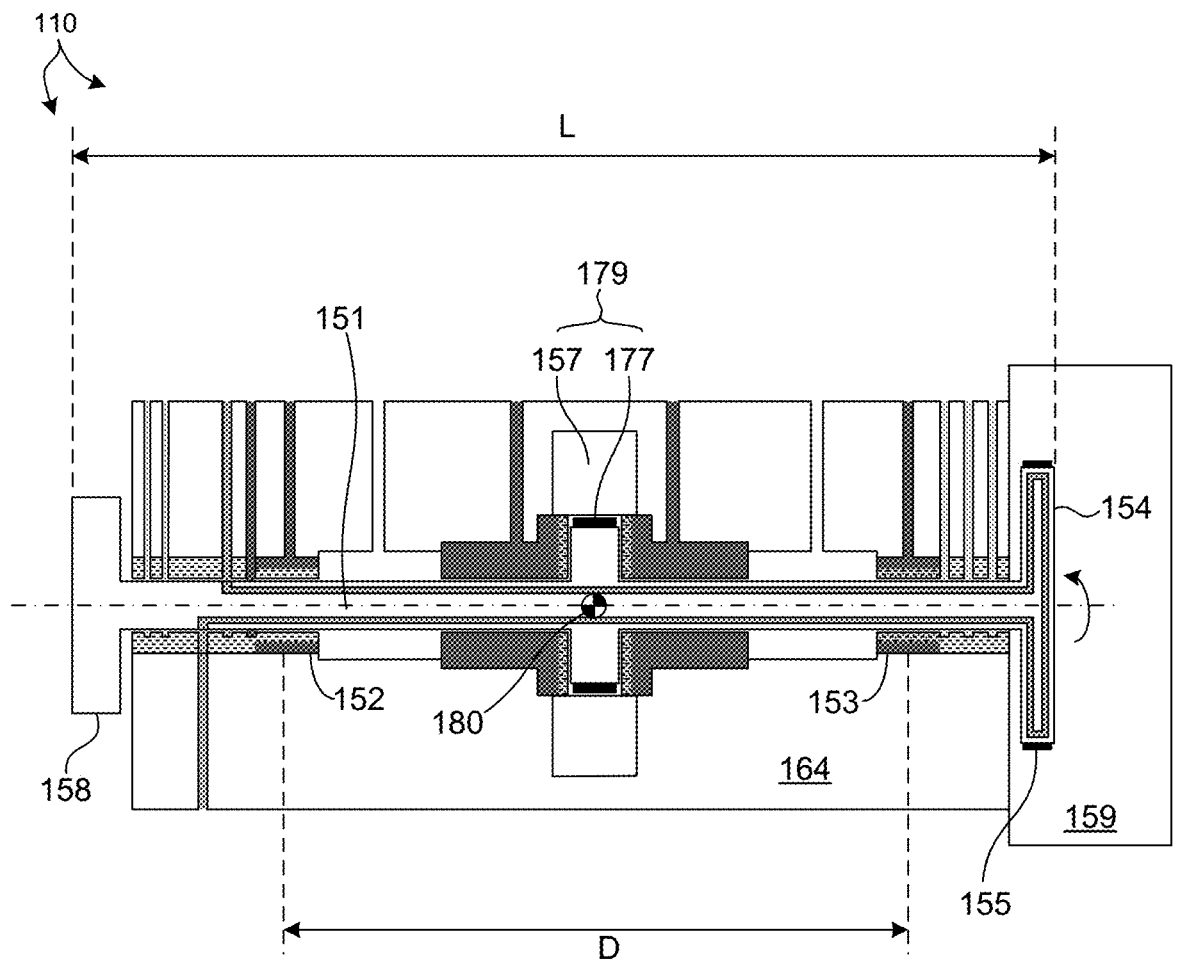
FIG. 3 is a simplified diagram illustrative of a cross-sectional view of the embodiment of the water cooled, air bearing based rotating anode subsystem depicted in FIG. 2.

In some embodiments, as depicted in FIG. 3, the spacing, D, between radial air bearings 152 and 153 is approximately 250 millimeters. However, in general, the spacing between radial air bearing 152 and 153 may be any suitable distance. In some embodiments, the distance, D, between radial air bearings 152 and 153 is greater than 80% of the total length, L, of the rotary spindle shaft.

As depicted in FIG. 3, the center of mass 180 of the rotating assembly is located close to the center of bending stiffness of the rotating assembly. In some embodiments, the center of mass 180 of the rotating assembly is within 5 centimeters of the center of bending stiffness of the rotating assembly. In some embodiments, the center of mass 180 of the rotating assembly is coincident with the center of bending stiffness of the rotating assembly. Furthermore, in some embodiments, rotary motor 179 is located within 5 centimeters of the center of mass 180 of the rotating assembly.

In another aspect, radial air bearing 153 includes vacuum scavenged annular grooves at the interface with vacuum chamber 159 to minimize molecular flow from air bearing 153 to vacuum chamber 159. As depicted in FIG. 2, radial air bearing 153 includes annular grooves 165 having a flow path to ports 166. In this manner, the annular grooves 165 are coupled to a vacuum source. As depicted in FIG. 2, annular grooves 165 are disposed adjacent to the rotary spindle shaft between the load bearing surface of rotary air bearing 153 and vacuum chamber 159. Vacuum 162 is applied to ports 166 and evacuates the air flow leaking from the air film interface between the load bearing surface of radial air bearing 153 and rotary spindle shaft 151 before it reaches vacuum chamber 159. In addition, vacuum chamber 159 includes a molecular pump to remove any amount of air that reaches vacuum chamber 159. Although three annular grooves 165 are depicted in FIG. 2, in general, any suitable number of vacuum pumped annular grooves located between the load bearing surface of radial air bearing 153 and vacuum chamber 159 may be contemplated. Furthermore, each annular groove may be fluidically coupled to an individual port, or alternatively, multiple annular grooves may be fluidically coupled to a single port.

In another aspect, radial air bearing 152 includes at least four annular grooves between the load bearing surface of radial air bearing 152 and the terminal end of rotary spindle shaft 151 opposite platen 154. As depicted in FIG. 2, annular groove 176 closest to the load bearing surface of radial air bearing 152 is coupled to a pressurized gas source, e.g., clean, dry, compressed air source. In the embodiment depicted in FIG. 2, pressurized clean, dry air 163 is delivered to annular groove 176 via port 170.

Annular grooves 173 are located closest to the terminal end of rotary spindle shaft 151 and are coupled to a vacuum source. Vacuum 161 is applied to annular grooves 173 via ports 174.

In addition, annular grooves 175 and 181 are coupled to a coolant source 160A and a coolant return 160B, respectively. Coolant is provided annular groove 175 via port 171 and coolant is returned from annular groove 181 via port 172. As depicted in FIG. 2, coolant channels 182 and 183 are located within rotary spindle shaft. Coolant channels 182 and 183 extend in a direction parallel to the rotational axis of the rotary spindle shaft from the rotary platen 154 to annular grooves 175 and 181. As depicted in FIG. 2, annular groove 175 is coupled to coolant channel 182, which is in turn coupled to cooling channels within rotary platen 154. Similarly, annular groove 181 is coupled to coolant channel 183, which is in turn coupled to the cooling channels within rotary platen 154. Coolant is conveyed from annular groove 175, through cooling channel 182, through the cooling channels within rotary platen 154, and then returned through coolant channel 183 and annular groove 181. The coolant flow through rotary platen 154 extracts heat from rotary platen 154 to maintain a constant temperature and minimize any geometrical distortions of rotary platen 154 induced by changing temperatures. The heat extracted from rotary platen 154 may be generated by a number of sources including 1) the interaction of the electron beam 103 with anode material 155, 2) heat generated by rotary motor 179 conducted to rotary platen 154 via rotary spindle shaft 151, and 3) heat generated by frictional losses at the bearing surfaces conducted to rotary platen 154 via rotary spindle shaft 151. Although coolant channels 182 and 183 are depicted as channels located side by side along rotary spindle shaft 151, in some other embodiments, co-axial channels may be located along rotary spindle shaft 151; concentric with the axis of rotation, A.

As depicted in FIG. 2, annular grooves 175 and 181 are located between annular grooves 173 and 176. Vacuum 161 is applied to annular grooves 173 via ports 174 and evacuates the coolant flow leaking from the coolant film interface between the radial air bearing 153 and rotary spindle shaft 151 near annular grooves 175 and 181 before it reaches the environment outside housing 164. In addition, pressurized clean, dry air 163 is applied to groove 176 to force any coolant flow leaking from the coolant film interface between the radial air bearing 153 and rotary spindle shaft 151 away from the load bearing surface of radial air bearing 152 and toward annular grooves 173. In this manner, annular grooves 173 and 176 work together to trap leaked coolant between annular grooves 173 and 176, and remove the trapped coolant via annular grooves 173. Although annular grooves 173 are depicted as two annular grooves and annular groove 176 is depicted as one annular groove, in general any suitable number of grooves may be employed.

In another aspect, thrust bearings 156A-B are designed to operate as a squeeze film damper to minimize vibration in the axial direction, i.e., the direction parallel to axis, A.

Although thrust bearings 156A-B are depicted as air bearings, in some other embodiments, thrust bearings 156A-B are magnetic bearings. In general, magnetic bearings are less stiff in the loading direction compared to air bearings. However, the gap between the magnetic bearing and the opposing surface, e.g., flange 178 is actively controlled. In some embodiments, the magnetic bearing is controlled to maintain a fixed gap. In some other embodiments, the magnetic bearing is controlled to maintain a desired gap over an operational range of up to three millimeters. In these embodiments, the axial position of the rotating assembly, including anode material 155 is precisely controlled over a range of at least one millimeter, e.g., up to three millimeters. This may be desirable to continuously refresh the anode material in the path of the electron beam 103 during operation by continuously moving the anode material 155 in the axial direction, while spinning rotary platen 154 at high speed.

The coincidence of anode material 113 and the stream of electrons 105 produces x-ray emission 108 incident on inspection area 102 of specimen 101. In some embodiments, the x-ray illumination source collects K-shell emission, L-shell emission, or a combination thereof, from the anode material. In some embodiments, it is preferred to have a x-ray source photon energy in a range from 10 keV to 25 keV to penetrate through a silicon wafer with suitable transmission efficiency for Transmission Small Angle X-ray Scattering (T-SAXS) based semiconductor metrology applications such as critical dimension and overlay metrology on patterned silicon wafers.

In some embodiments, the distance between specimen 101 and anode material 113 is lengthy (e.g., greater than one meter). In these embodiments, air present in the beam path introduces undesirable beam scattering. Hence, in some embodiments it is preferred to propagate x-ray beam 108 through an evacuated flight tube from the x-ray illumination source to specimen 101.

In some embodiments, the x-ray detector 123 is maintained in the same atmospheric environment as specimen 101 (e.g., gas purge environment). However, in some embodiments, the distance between specimen 101 and x-ray detector 123 is lengthy (e.g., greater than one meter). In these embodiments, air present in the beam path introduces undesirable beam scattering, especially when the x-ray illumination source is configured to generate hard x-rays (e.g., photon energy greater than 5 keV). Hence in some embodiments, the x-ray detector 123 is maintained in a localized, vacuum environment separated from the specimen (e.g., specimen 101) by a vacuum window.

In some embodiments, it is desirable to maintain the x-ray illumination beam 108, specimen 101, the collection beam 122, and detector 123 in an evacuated environment to minimize absorption of x-rays. This is especially desirable if the x-ray illumination source is configured to generate soft x-rays (e.g., photon energy less than 5 keV).

Figure 4:
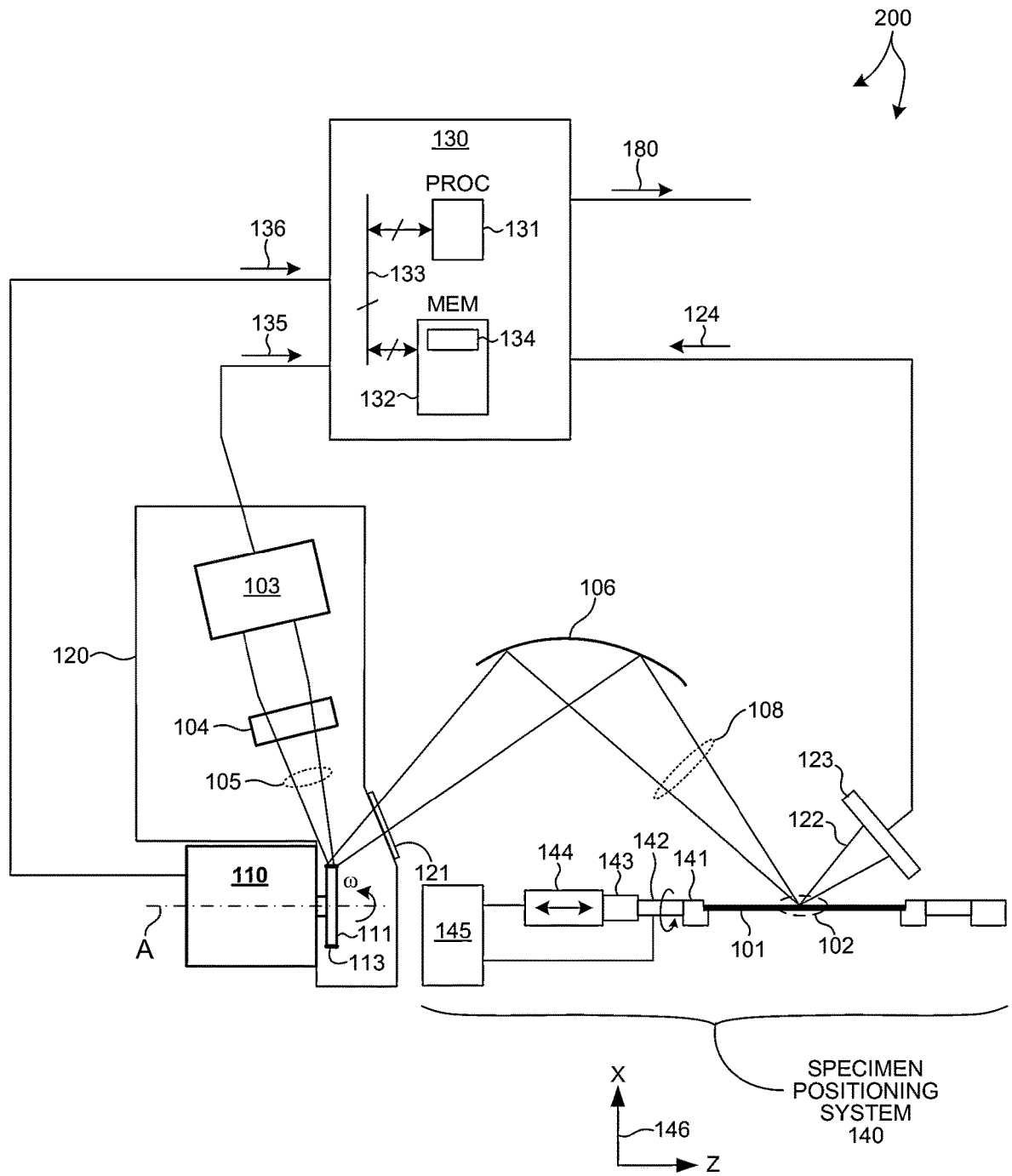
FIG. 4 is a simplified diagram illustrative of another embodiment of a metrology system including a water cooled, air bearing based rotating anode X-Ray illumination source for measuring characteristics of a specimen in at least one novel aspect.

FIG. 4 illustrates an x-ray metrology system 200 for performing semiconductor metrology measurements. As illustrated in FIG. 4, x-ray metrology system 200 includes similar, like numbered elements described with reference to FIG. 1. By way of non-limiting example, x-ray metrology system 200 operates in a reflective mode, rather than a transmission mode as illustrated in FIG. 1. In some embodiments, x-ray metrology system 200 is configured as a grazing incidence small-angle x-ray scattering (GISAXS) measurement system. Typical angles of incidence and collection are approximately one degree as measured from the surface of the specimen, or approximately eighty nine degrees from an axis normal to the surface of the specimen. X-ray metrology system 200 includes an x-ray illumination source as described with reference to FIG. 1. X-ray metrology system 200 is configured such that x-rays which are scattered from the specimen are collected by a detector specimen positioning system 140 positions the specimen. In addition any other particles produced during the interaction such as photoelectrons, x-rays produced through fluorescence, or ions can be detected. Metrology systems configured to perform GISAXS measurements require a high brightness x-ray source to maintain sufficient brightness over the relatively large sample area illuminated at small angles. For this reason, a rotating anode based x-ray illumination source is particularly well suited for GISAXS measurements.

By way of non-limiting example, the x-ray metrology system 100 illustrated in FIG. 1 is configured as a transmission small angle x-ray scatterometer (TSAXS) and the x-ray metrology system 200 illustrated in FIG. 4 is configured as a grazing incidence small angle x-ray scatterometer (GISAXS). However, in general, an x-ray metrology system employing a rotating anode based x-ray illumination source as described herein may employ any one or more of the following metrology techniques: transmission small angle x-ray scattering (TSAXS), grazing incidence small angle x-ray scattering (GISAXS), wide angle x-ray scattering (WAXS), x-ray reflectometry (XRR), grazing incidence x-ray reflectometry (GXR), x-ray diffraction (XRD), grazing incidence x-ray diffraction (GIXRD), high resolution x-ray diffraction (HRXRD), x-ray photoelectron spectroscopy (XPS), x-ray fluorescence (XRF), total reflection x-ray fluorescence (TXRF), grazing incidence x-ray fluorescence (GIXRF), x-ray tomography, x-ray ellipsometry, and hard x-ray photoemission spectrometry (HXPS).

X-ray metrology tool 100 also includes computing system 130 employed to acquire signals 124 generated by x-ray detector 123 and determine properties of the specimen based at least in part on the acquired signals. As illustrated in FIG. 1, computing system 130 is communicatively coupled to x-ray detector 123. In one example, x-ray detector 123 is an x-ray spectrometer and measurement data 124 includes an indication of the measured spectral response of the specimen based on one or more sampling processes implemented by the x-ray spectrometer. Computing system 130 is configured to build models of the specimen, create x-ray simulations based upon the models, and analyze the simulations and signals 124 received from x-ray detector 123 to determine one or more characteristics of the sample (e.g., a value of a parameter of interest 180 of a structure under measurement).

In a further embodiment, computing system 130 is configured to access model parameters in real-time, employing Real Time Critical Dimensioning (RTCD), or it may access libraries of pre-computed models for determining a value of at least one specimen parameter value associated with the specimen 101. In general, some form of CD-engine may be used to evaluate the difference between assigned CD parameters of a specimen and CD parameters associated with the measured specimen. Exemplary methods and systems for computing specimen parameter values are described in U.S. Pat. No. 7,826,071, issued on Nov. 2, 2010, to KLA-Tencor Corp., the entirety of which is incorporated herein by reference.

In one example, measurement data 124 includes an indication of the measured x-ray response of the specimen. Based on the distribution of the measured x-ray response on the surface of detector 123, the location and area of incidence of x-ray beam 108 on specimen 101 is determined by computing system 130. In one example, pattern recognition techniques are applied by computing system 130 to determine the location and area of incidence of x-ray beam 108 on specimen 101 based on measurement data 124. In response computing system 130 generates command signals to any of electron optics 104 and x-ray optics 106 to redirect and reshape incident x-ray illumination beam 108.

In another aspect, x-ray measurements of a particular inspection area are performed at a number of different out of plane orientations. This increases the precision and accuracy of measured parameters and reduces correlations among parameters by extending the number and diversity of data sets available for analysis to include a variety of large-angle, out of plane orientations. Measuring specimen parameters with a deeper, more diverse data set also reduces correlations among parameters and improves measurement accuracy.

As illustrated in FIG. 1, x-ray metrology tool 100 includes a specimen positioning system 140 configured to both align specimen 101 and orient specimen 101 over a large range of out of plane angular orientations with respect the x-ray illumination source. In other words, specimen positioning system 140 is configured to rotate specimen 101 over a large angular range about one or more axes of rotation aligned in-plane with the surface of specimen 101. In some embodiments, specimen positioning system 140 is configured to rotate specimen 101 within a range of at least 90 degrees about one or more axes of rotation aligned in-plane with the surface of specimen 101. In some embodiments, specimen positioning system is configured to rotate specimen 101 within a range of at least 60 degrees about one or more axes of rotation aligned in-plane with the surface of specimen 101. In some other embodiments, specimen positioning system is configured to rotate specimen 101 within a range of at least one degree about one or more axes of rotation aligned in-plane with the surface of specimen 101. In this manner, angle resolved measurements of specimen 101 are collected by x-ray metrology system 100 over any number of locations on the surface of specimen 101. In one example, computing system 130 communicates command signals to motion controller 145 of specimen positioning system 140 that indicate the desired position of specimen 101. In response, motion controller 145 generates command signals to the various actuators of specimen positioning system 140 to achieve the desired positioning of specimen 101. By way of non-limiting example, a specimen positioning system may include any combination of a hexapod, linear, and angular stages.

By way of non-limiting example, as illustrated in FIG. 1, specimen positioning system 140 includes an edge grip chuck 141 to fixedly attach specimen 101 to specimen positioning system 140. A rotational actuator 142 is configured to rotate edge grip chuck 141 and the attached specimen 101 with respect to a perimeter frame 143. In the depicted embodiment, rotational actuator 142 is configured to rotate specimen 101 about the x-axis of the coordinate system 146 illustrated in FIG. 1. As depicted in FIG. 1, a rotation of specimen 101 about the z-axis is an in plane rotation of specimen 101. Rotations about the x-axis and the y-axis (not shown) are out of plane rotations of specimen 101 that effectively tilt the surface of the specimen with respect to the metrology elements of metrology system 100. Although it is not illustrated, a second rotational actuator is configured to rotate specimen 101 about the y-axis. A linear actuator 144 is configured to translate perimeter frame 143 in the x-direction. Another linear actuator (not shown) is configured to translate perimeter frame 143 in the y-direction. In this manner, every location on the surface of specimen 101 is available for measurement over a range of out of plane angular positions. For example, in one embodiment, a location of specimen 101 is measured over several angular increments within a range of −45 degrees to +45 degrees with respect to the normal orientation of specimen 101.

The large, out of plane, angular positioning capability of specimen positioning system 140 expands measurement sensitivity and reduces correlations between parameters. For example, in a normal orientation, SAXS is able to resolve the critical dimension of a feature, but is largely insensitive to sidewall angle and height of a feature. However, collecting measurement data over a broad range of out of plane angular positions enables the collection of measurement data associated with a number of diffraction orders. This enables the sidewall angle and height of a feature to be resolved. In addition, other features such as rounding or any other shapes associated with advanced structures can be resolved.

A x-ray metrology tool employing a rotating anode based x-ray illumination source as described herein enables increased measurement sensitivity and throughput due to the high brightness and short wavelength radiation (e.g., photon energy greater than 500 eV) generated by the source. By way of non-limiting example, the x-ray metrology tool is capable of measuring geometric parameters (e.g., pitch, critical dimension (CD), side wall angle (SWA), line width roughness (LWR), and line edge roughness (LER)) of structures smaller than 10 nanometers. In addition, the high energy nature of x-ray radiation penetrates optically opaque thin films, buried structures, high aspect ratio structures, and devices including many thin film layers.

A x-ray metrology system employing a high brightness x-ray illumination source as described herein may be used to determine characteristics of semiconductor structures. Exemplary structures include, but are not limited to, FinFETs, low-dimensional structures such as nanowires or graphene, sub 10 nm structures, thin films, lithographic structures, through silicon vias (TSVs), memory structures such as DRAM, DRAM 4F2, FLASH and high aspect ratio memory structures. Exemplary structural characteristics include, but are not limited to, geometric parameters such as line edge roughness, line width roughness, pore size, pore density, side wall angle, profile, film thickness, critical dimension, pitch, and material parameters such as electron density, crystalline grain structure, morphology, orientation, stress, and strain.

Figure 5:
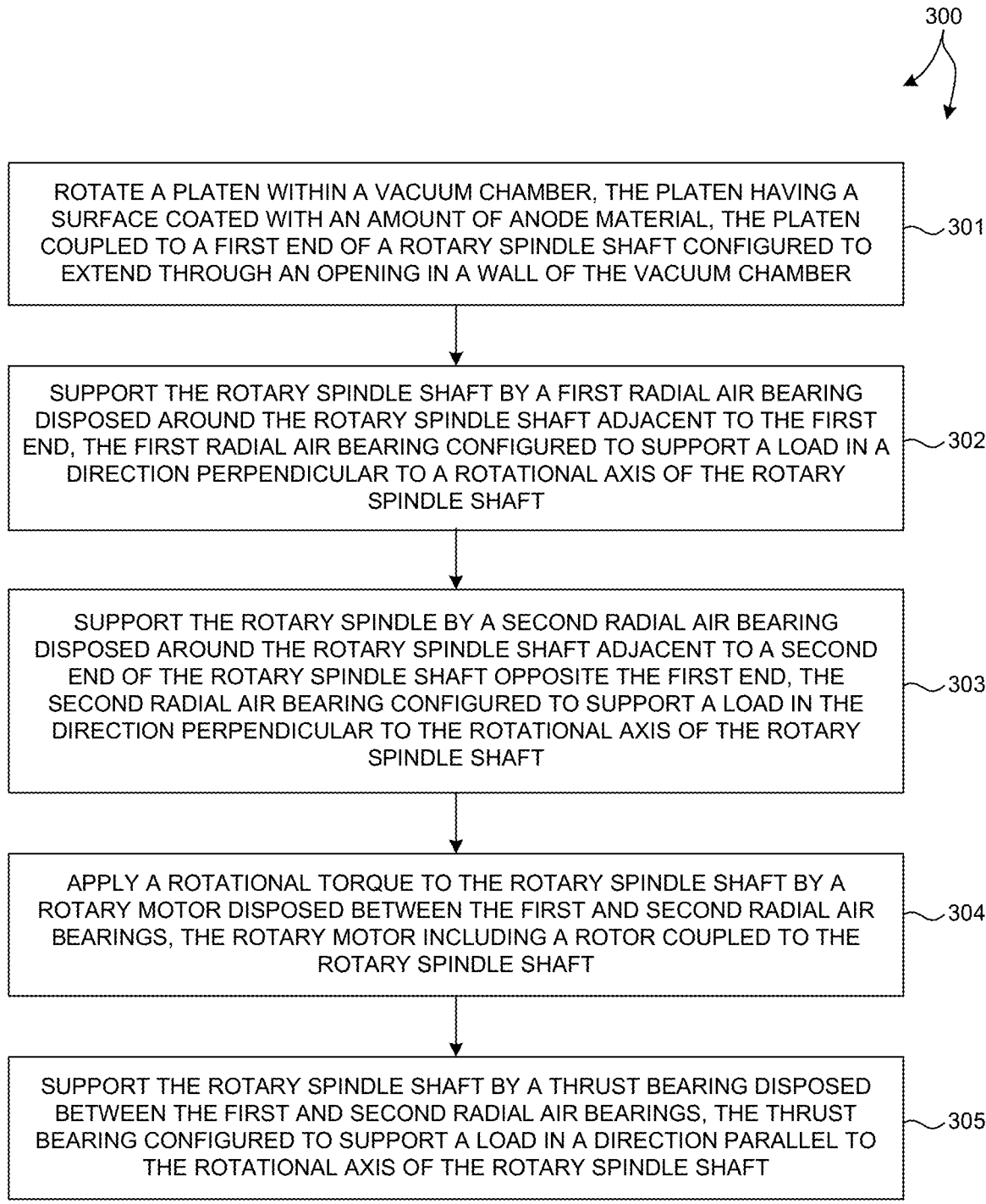
FIG. 5 is a flowchart of a method of performing measurements of a semiconductor wafer with a metrology system employing a water cooled, air bearing based rotating anode X-Ray illumination source in accordance with the methods described herein.

FIG. 5 illustrates a method 300 suitable for implementation by the x-ray metrology systems 100 and 200 of the present invention. In one aspect, it is recognized that any data processing elements of method 300 may be carried out via a pre-programmed algorithm executed by one or more processors of computing system 130. While the following description is presented in the context of x-ray metrology systems 100 and 200, it is recognized herein that the particular structural aspects of x-ray metrology systems 100 and 200 do not represent limitations and should be interpreted as illustrative only.

In block 301, a platen is rotated within a vacuum chamber. The platen has a surface coated with an amount of anode material, and the platen is coupled to a first end of a rotary spindle shaft configured to extend through an opening in a wall of the vacuum chamber.

In block 302, the rotary spindle shaft is supported by a first radial air bearing disposed around the rotary spindle shaft adjacent to the first end. The first radial air bearing is configured to support a load in a direction perpendicular to a rotational axis of the rotary spindle shaft.

In block 303, the rotary spindle shaft is supported by a second radial air bearing disposed around the rotary spindle shaft adjacent to a second end of the rotary spindle shaft opposite the first end. The second radial air bearing is configured to support a load in the direction perpendicular to the rotational axis of the rotary spindle shaft.

In block 304, a rotational torque is applied to the rotary spindle shaft by a rotary motor disposed between the first and second radial air bearings. The rotary motor includes a rotor coupled to the rotary spindle shaft.

In block 305, the rotary spindle shaft is supported by a thrust bearing disposed between the first and second radial air bearings. The thrust bearing is configured to support a load in a direction parallel to the rotational axis of the rotary spindle shaft.

It should be recognized that the various steps described throughout the present disclosure may be carried out by a single computer system 130 or, alternatively, a multiple computer system 130. Moreover, different subsystems of the metrology systems 100 and 200, such as the specimen positioning system 140, may include a computer system suitable for carrying out at least a portion of the steps described herein. Therefore, the aforementioned description should not be interpreted as a limitation on the present invention but merely an illustration. Further, the one or more computing systems 130 may be configured to perform any other step(s) of any of the method embodiments described herein.

In addition, the computer system 130 may be communicatively coupled to the x-ray detector 123, electron optics 104, x-ray optics 106, electron beam source 103, rotary anode subsystem 110, and specimen positioning system 140 in any manner known in the art. For example, the one or more computing systems 130 may be coupled to computing systems associated with x-ray detector 123, electron optics 104, x-ray optics 106, electron beam source 103, rotary anode subsystem 110, and specimen positioning system 140, respectively. In another example, any of x-ray detector 123, electron optics 104, x-ray optics 106, electron beam source 103, rotary anode subsystem 110, and specimen positioning system 140 may be controlled directly by a single computer system coupled to computer system 130.

The computer system 130 of the x-ray metrology systems 100 and 200 may be configured to receive and/or acquire data or information from the subsystems of the system (e.g., x-ray detector 123, electron optics 104, x-ray optics 106, electron beam source 103, rotary anode subsystem 110, and specimen positioning system 140, and the like) by a transmission medium that may include wireline and/or wireless portions. In this manner, the transmission medium may serve as a data link between the computer system 130 and other subsystems of the system 100.

Computer system 130 of the metrology systems 100 and 200 may be configured to receive and/or acquire data or information (e.g., measurement results, modeling inputs, modeling results, etc.) from other systems by a transmission medium that may include wireline and/or wireless portions. In this manner, the transmission medium may serve as a data link between the computer system 130 and other systems (e.g., memory on-board metrology system 100, external memory, or external systems). For example, the computing system 130 may be configured to receive measurement data (e.g., output signals 124) from a storage medium (i.e., memory 132) via a data link. For instance, spectral results obtained using a spectrometer of x-ray detector 123 may be stored in a permanent or semi-permanent memory device (e.g., memory 132). In this regard, the spectral results may be imported from on-board memory or from an external memory system. Moreover, the computer system 130 may send data to other systems via a transmission medium. For instance, specimen parameter values 180 determined by computer system 130 may be stored in a permanent or semi-permanent memory device. In this regard, measurement results may be exported to another system.

Computing system 130 may include, but is not limited to, a personal computer system, mainframe computer system, workstation, image computer, parallel processor, or any other device known in the art. In general, the term "computing system" may be broadly defined to encompass any device having one or more processors, which execute instructions from a memory medium.

Program instructions 134 implementing methods such as those described herein may be transmitted over a transmission medium such as a wire, cable, or wireless transmission link. For example, as illustrated in FIG. 1, program instructions stored in memory 132 are transmitted to processor 131 over bus 133. Program instructions 134 are stored in a computer readable medium (e.g., memory 132). Exemplary computer-readable media include read-only memory, a random access memory, a magnetic or optical disk, or a magnetic tape.

In some embodiments, x-ray metrology as described herein is implemented as part of a fabrication process tool. Examples of fabrication process tools include, but are not limited to, lithographic exposure tools, film deposition tools, implant tools, and etch tools. In this manner, the results of x-ray measurements are used to control a fabrication process. In one example, x-ray measurement data collected from one or more targets is sent to a fabrication process tool. The x-ray data is analyzed and the results used to adjust the operation of the fabrication process tool.

As described herein, the term "critical dimension" includes any critical dimension of a structure (e.g., bottom critical dimension, middle critical dimension, top critical dimension, sidewall angle, grating height, etc.), a critical dimension between any two or more structures (e.g., distance between two structures), and a displacement between two or more structures (e.g., overlay displacement between overlaying grating structures, etc.). Structures may include three dimensional structures, patterned structures, overlay structures, etc.

As described herein, the term "critical dimension application" or "critical dimension measurement application" includes any critical dimension measurement.

As described herein, the term "metrology system" includes any system employed at least in part to characterize a specimen in any aspect, including critical dimension applications and overlay metrology applications. However, such terms of art do not limit the scope of the term "metrology system" as described herein. In addition, the metrology systems described herein may be configured for measurement of patterned wafers and/or unpatterned wafers. The metrology system may be configured as a LED inspection tool, edge inspection tool, backside inspection tool, macro-inspection tool, or multi-mode inspection tool (involving data from one or more platforms simultaneously), and any other metrology or inspection tool that benefits from the measurement techniques described herein.

Various embodiments are described herein for a semiconductor processing system (e.g., an inspection system or a lithography system) that may be used for processing a specimen. The term "specimen" is used herein to refer to a wafer, a reticle, or any other sample that may be processed (e.g., printed or inspected for defects) by means known in the art.

As used herein, the term "wafer" generally refers to substrates formed of a semiconductor or non-semiconductor material. Examples include, but are not limited to, monocrystalline silicon, gallium arsenide, and indium phosphide. Such substrates may be commonly found and/or processed in semiconductor fabrication facilities. In some cases, a wafer may include only the substrate (i.e., bare wafer). Alternatively, a wafer may include one or more layers of different materials formed upon a substrate. One or more layers formed on a wafer may be "patterned" or "unpatterned." For example, a wafer may include a plurality of dies having repeatable pattern features.

A "reticle" may be a reticle at any stage of a reticle fabrication process, or a completed reticle that may or may not be released for use in a semiconductor fabrication facility. A reticle, or a "mask," is generally defined as a substantially transparent substrate having substantially opaque regions formed thereon and configured in a pattern. The substrate may include, for example, a glass material such as amorphous $SiO_2$. A reticle may be disposed above a resist-covered wafer during an exposure step of a lithography process such that the pattern on the reticle may be transferred to the resist.

One or more layers formed on a wafer may be patterned or unpatterned. For example, a wafer may include a plurality of dies, each having repeatable pattern features. Formation and processing of such layers of material may ultimately result in completed devices. Many different types of devices may be formed on a wafer, and the term wafer as used herein is intended to encompass a wafer on which any type of device known in the art is being fabricated.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, XRF disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A high speed rotating anode system, comprising:
    a rotary spindle shaft, a first end of the rotary spindle shaft configured to extend through an opening in a wall of a vacuum chamber;
    a rotary platen coupled to the first end of the rotary spindle shaft, an anode material disposed on a surface of the rotary platen, the rotary platen configured to rotate within the vacuum chamber;
    a counterweight configured to be attached to a second end of the rotary spindle shaft opposite the first end;
    a first radial air bearing disposed around the rotary spindle shaft adjacent to the first end, the first radial air bearing configured to support a load in a direction perpendicular to a rotational axis of the rotary spindle shaft;
    a second radial air bearing disposed around the rotary spindle shaft adjacent to the second end of the rotary spindle shaft, the second radial air bearing configured to support a load in the direction perpendicular to the rotational axis of the rotary spindle shaft;
    a rotary motor disposed between the first and second radial air bearings, the rotary motor configured to apply a rotational torque to the rotary spindle shaft, the rotary motor including a rotor coupled to the rotary spindle shaft; and
    a thrust bearing disposed between the first and second radial air bearings, the thrust bearing configured to support a load in a direction parallel to the rotational axis of the rotary spindle shaft.

2. The high speed rotating anode system of claim 1, wherein the rotary motor is located within 5 centimeters of a center of mass of a rotating assembly, the rotating assembly including the rotary spindle shaft, the rotary platen, the counterweight, and the rotor.

3. The high speed rotating anode system of claim 1, wherein a center of mass of a rotating assembly is within 5 centimeters of a center of bending stiffness of the rotating assembly, the rotating assembly including the rotary spindle shaft, the rotary platen, the counterweight, and the rotor.

4. The high speed rotating anode system of claim 1, the first rotary air bearing including one or more annular grooves coupled to a vacuum source, the one or more annular grooves disposed adjacent to the rotary spindle shaft between a load bearing surface of the first rotary air bearing and the vacuum chamber.

5. The high speed rotating anode system of claim 1, the second rotary air bearing including a first annular groove coupled to a coolant source, a second annular groove coupled to a coolant return, a third annular groove coupled to a vacuum source, and a fourth annular groove coupled to a pressurized gas source, the third annular groove located closest to the second end of the rotary spindle shaft, the fourth annular groove located closest to a load bearing surface of the second rotary air bearing, and the first and second annular grooves located between the third and fourth annular grooves.

6. The high speed rotating anode system of claim 5, further comprising:
    at least two coolant channels within the rotary spindle shaft extending in a direction parallel to the rotational axis of the rotary spindle shaft, the channels extending from the rotary platen to the first and second annular grooves.

7. The high speed rotating anode system of claim 1, wherein a distance between the first and second radial air bearings is greater than 80% of the total length of the rotary spindle shaft.

8. The high speed rotating anode system of claim 1, wherein the first and second radial air bearings are porous air bearings or groove compensated air bearings.

9. The high speed rotating anode system of claim 1, wherein the rotary motor is a brushless servo motor.

10. The high speed rotating anode system of claim 1, wherein the rotary platen is removable from the rotary spindle shaft.

11. The high speed rotating anode system of claim 1, wherein the thrust bearing is a porous air bearing or a groove compensated air bearing.

12. The high speed rotating anode system of claim 1, wherein the thrust bearing is a magnetic bearing.

13. The high speed rotating anode system of claim 12, wherein a gap of the magnetic thrust bearing is controlled to a desired distance within a range of at least 1 millimeter.

14. A method comprising:
    rotating a platen within a vacuum chamber, the platen having a surface coated with an amount of anode material, the platen coupled to a first end of a rotary spindle shaft configured to extend through an opening in a wall of the vacuum chamber;
    supporting the rotary spindle shaft by a first radial air bearing disposed around the rotary spindle shaft adjacent to the first end, the first radial air bearing configured to support a load in a direction perpendicular to a rotational axis of the rotary spindle shaft;
    supporting the rotary spindle by a second radial air bearing disposed around the rotary spindle shaft adjacent to a second end of the rotary spindle shaft opposite the first end, the second radial air bearing configured to support a load in the direction perpendicular to the rotational axis of the rotary spindle shaft;
    applying a rotational torque to the rotary spindle shaft by a rotary motor disposed between the first and second radial air bearings, the rotary motor including a rotor coupled to the rotary spindle shaft; and
    supporting the rotary spindle shaft by a thrust bearing disposed between the first and second radial air bearings, the thrust bearing configured to support a load in a direction parallel to the rotational axis of the rotary spindle shaft.

15. The method of claim 14, further comprising:
    generating an electron beam directed to the amount of anode material at a location on the surface of the platen, wherein the interaction of the electron beam with the anode material causes the anode material to emit x-ray illumination light;

directing the x-ray illumination light to a specimen under measurement;

detecting an amount of light from the specimen in response to the x-ray illumination light; and determining a value of at least one parameter of interest of the specimen under measurement based on the amount of detected light.

16. The method of claim 14, further comprising:

translating the platen within the vacuum chamber in a direction parallel to the rotational axis of the rotary spindle shaft, wherein the thrust bearing is a magnetic bearing, and wherein the translating involves controlling a gap between the magnetic bearing and the rotary spindle shaft to a desired distance within a range of at least 1 millimeter.

17. The method of claim 14, wherein a distance between the first and second radial air bearings is greater than 80% of the total length of the rotary spindle shaft.

18. The method of claim 14, wherein the rotary motor is located within 5 centimeters of a center of mass of a rotating assembly, the rotating assembly including the rotary spindle shaft, the rotary platen, a counterweight, and the rotor.

19. The method of claim 14, further comprising:

extracting heat from the platen by flowing coolant through the rotary spindle shaft and the platen, wherein the flowing of the fluid involves flowing coolant through a first annular groove coupled to a coolant source and a second annular groove coupled to a coolant return, wherein the first and second annular grooves are located between a third annular groove and a fourth annular groove, the third annular groove coupled to a vacuum source and the fourth annular groove coupled to a pressurized gas source.

20. A metrology system, comprising:

an electron beam source configured to generate an electron beam directed to an anode material located on a surface of a platen, wherein the interaction of the electron beam with the anode material causes the anode material to emit x-ray illumination light;

a rotary spindle shaft, a first end of the rotary spindle shaft configured to extend through an opening in a wall of a vacuum chamber, the platen coupled to the first end of the rotary spindle shaft and rotated about a rotational axis of the rotary spindle shaft;

a first radial air bearing disposed around the rotary spindle shaft adjacent to the first end, the first radial air bearing configured to support a load in a direction perpendicular to the rotational axis of the rotary spindle shaft;

a second radial air bearing disposed around the rotary spindle shaft adjacent to a second end of the rotary spindle shaft opposite the first end, the second radial air bearing configured to support a load in the direction perpendicular to the rotational axis of the rotary spindle shaft;

a rotary motor disposed between the first and second radial air bearings, the rotary motor configured to apply a rotational torque to the rotary spindle shaft, the rotary motor including a rotor coupled to the rotary spindle shaft;

a thrust bearing disposed between the first and second radial air bearings, the thrust bearing configured to support a load in a direction parallel to the rotational axis of the rotary spindle shaft;

one or more x-ray illumination optics configured to direct the x-ray illumination light to a specimen under measurement;

a detector configured to detect an amount of light from the specimen in response to the x-ray illumination light; and a computing system configured to determine a value of at least one parameter of interest of the specimen under measurement based on the amount of detected light.

\* \* \* \* \*